Figure 3:
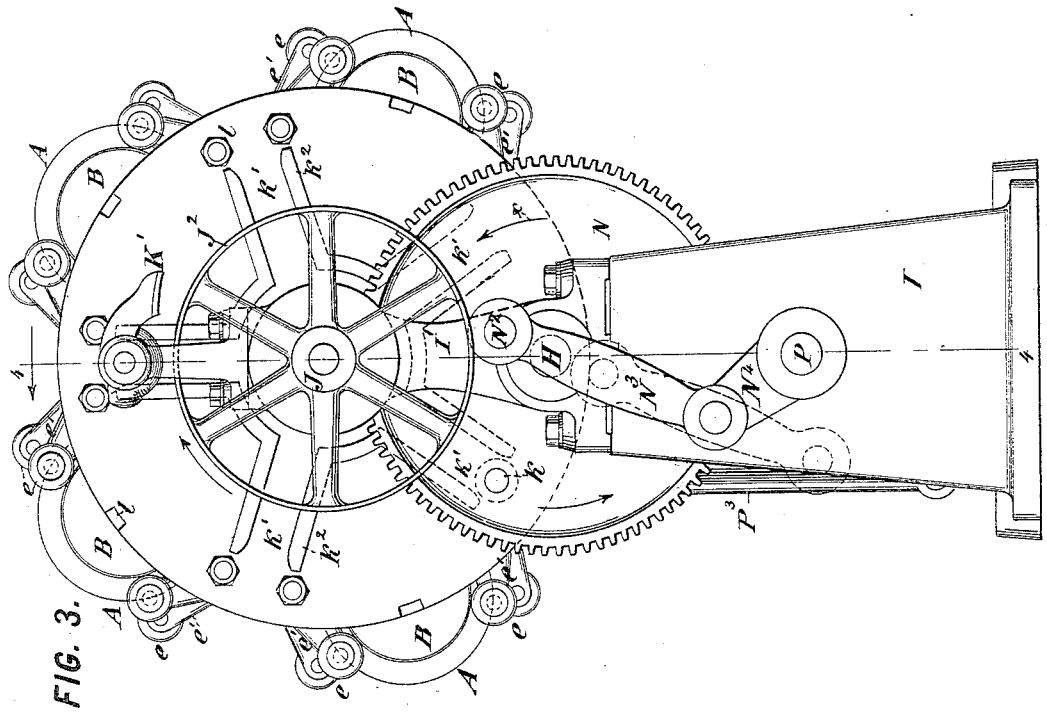

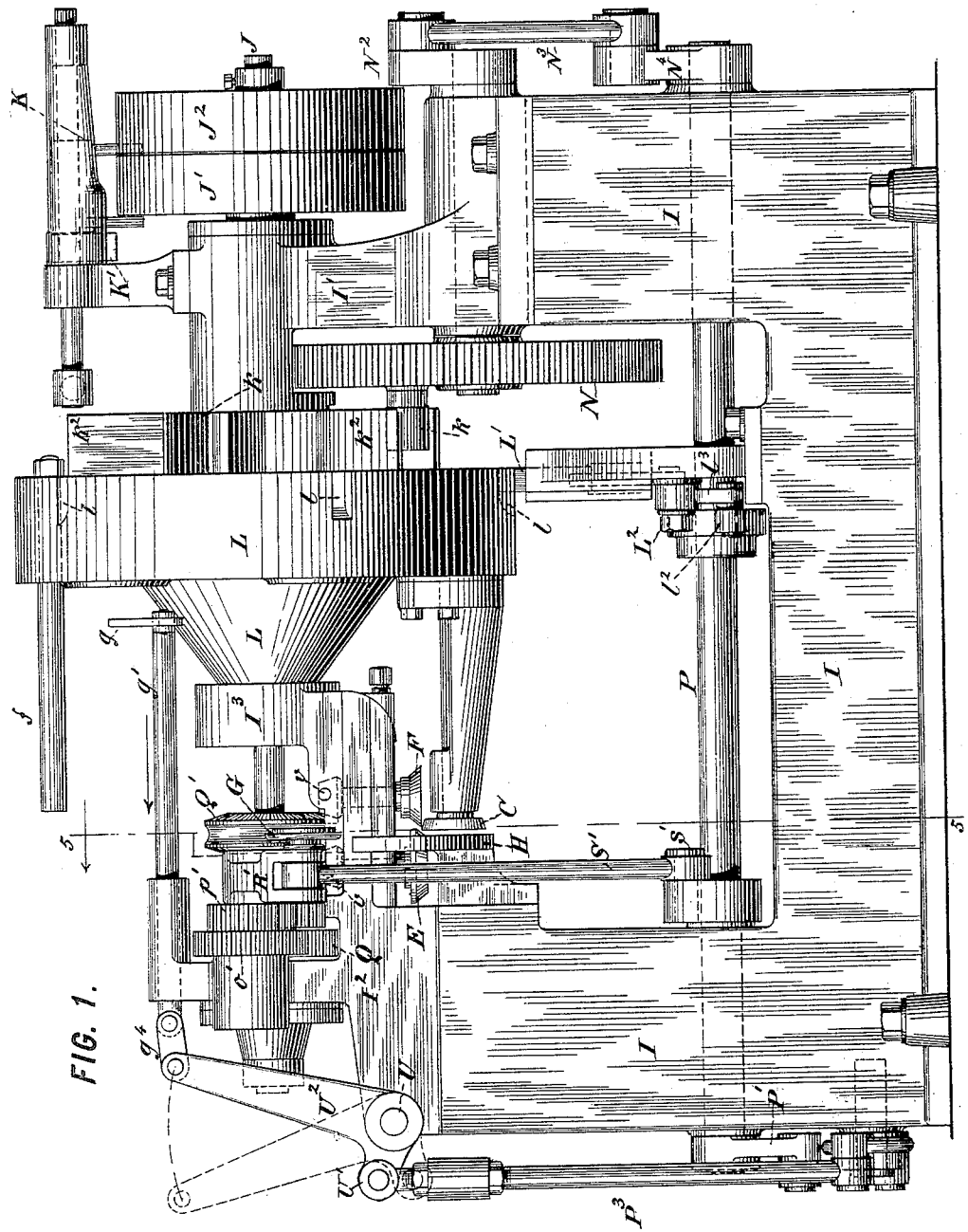

(No Model.) 7 Sheets—Sheet 2.

F. M. LEAVITT.
CAN SEAMING MACHINE.

No. 419,050. Patented Jan. 7, 1890.

WITNESSES:
John Becker
Fred White

INVENTOR:
Frank M. Leavitt,
By his Attorneys,
Arthur C. Fraser & Co.

(No Model.) 7 Sheets—Sheet 3.
F. M. LEAVITT.
CAN SEAMING MACHINE.

No. 419,050. Patented Jan. 7, 1890.

WITNESSES:
John Becker
Fred White

INVENTOR:
Frank M. Leavitt,
By his Attorneys,
Arthur E. Fraser (No Model.) 7 Sheets—Sheet 4.

F. M. LEAVITT.
CAN SEAMING MACHINE.

No. 419,050. Patented Jan. 7, 1890.

WITNESSES:
John Becker
Fred White

INVENTOR:
Frank M. Leavitt,
By his Attorneys,
Arthur E. Brasier & Co.

(No Model.) 7 Sheets—Sheet 5.

F. M. LEAVITT.
CAN SEAMING MACHINE.

No. 419,050. Patented Jan. 7, 1890.

WITNESSES:
John Becker
Fred White

INVENTOR:
Frank M. Leavitt,
By his Attorneys,
Arthur E. Fraser & Co.

(No Model.) 7 Sheets—Sheet 6.

F. M. LEAVITT.
CAN SEAMING MACHINE.

No. 419,050. Patented Jan. 7, 1890.

WITNESSES:
John Becker
Fred White

INVENTOR:
Frank M. Leavitt,
By his Attorneys,
Arthur C. Fraser & Co.

(No Model.) 7 Sheets—Sheet 7.

F. M. LEAVITT.
CAN SEAMING MACHINE.

No. 419,050. Patented Jan. 7, 1890.

WITNESSES:
Fred White
Jno. Glavin

INVENTOR:
Frank M. Leavitt,
By his Attorneys,
Arthur C. Fraser & Co.

UNITED STATES PATENT OFFICE.

FRANK M. LEAVITT, OF BROOKLYN, NEW YORK, ASSIGNOR TO THE E. W. BLISS COMPANY, OF SAME PLACE.

CAN-SEAMING MACHINE.

SPECIFICATION forming part of Letters Patent No. 419,050, dated January 7, 1890.

Application filed August 13, 1889. Serial No. 320,571. (No model.)

*To all whom it may concern:*

Be it known that I, FRANK M. LEAVITT, a citizen of the United States, residing in Brooklyn, in the county of Kings and State of New York, have invented certain new and useful Improvements in Can-Seaming Machines, of which the following is a specification.

This invention relates to machines for forming the double seam by which the head or bottom is secured to the body of the sheet-metal cans, coffee-pots, &c. Machines for doing this work are called "double-seamers," the seam being formed by two or more successive operations by folding or seaming rolls.

The object of this invention is to provide a machine which shall perform the successive seaming operations automatically and with greater rapidity than heretofore.

With my improved machine the only hand-power involved is that of feeding the cans to the machine, the successive seaming operations and the subsequent handling and delivery of the cans being performed automatically in as rapid succession as fresh cans can be conveniently fed to it by the attendant.

To this end my invention provides a series of traveling chucks or holders for carrying the cans, and two or more seamers constructed and arranged to act upon the cans successively in the successive positions to which they are brought by the movement of the holders. The traveling holders, which may be of any suitable construction to engage and carry the cans, are connected to each other and to a driving mechanism in such manner that they are caused to advance successively into position to be acted upon by the successive seamers, the movement being preferably intermittent, so that they remain at rest during the action of the seamers.

The seamers consist of folding or bending rollers, which may be of any construction heretofore used for turning down seams by successive folding or bending operations. Each seamer performs its action around the entire circumference of the can, preferably by the rotation of the can relatively to the axis of the seaming-roller, which may be stationary, this rotation of the can being effected by imparting a rotary movement to the chucks or holders through suitable gearing. The can is supported against the pressure of the seaming-rolls by a mandrel-roll or former entering within the can or within the seam, and which constitutes a portion of the chuck or holder for the can. Thus in the preferred construction of my machine a can is fed onto one of the chucks or holders in one position thereof. The holder then goes to the next following position, where the can is caused to execute a revolution while the first seamer acts upon it. The holder then moves to the second seaming position, and while stationary there the can is revolved while the second seamer acts upon it. The holder is then advanced to the third seaming position, where it stops while the can is revolved during the operation of the third seaming-roll, and finally the holder moves to the next position, where the can is removed from it and delivered out of the machine. Thus five chucks or holders may be employed, so that at each interval of rest a can is being fed onto one, while by three others the three successive seaming operations are being performed, and from the remaining one the completed can is being fed off.

Having thus briefly outlined the general nature and operation of my invention, I will now proceed to describe in detail a construction of machine embodying it in its preferred form. This machine is shown in the accompanying drawings, wherein—

Figure 2:
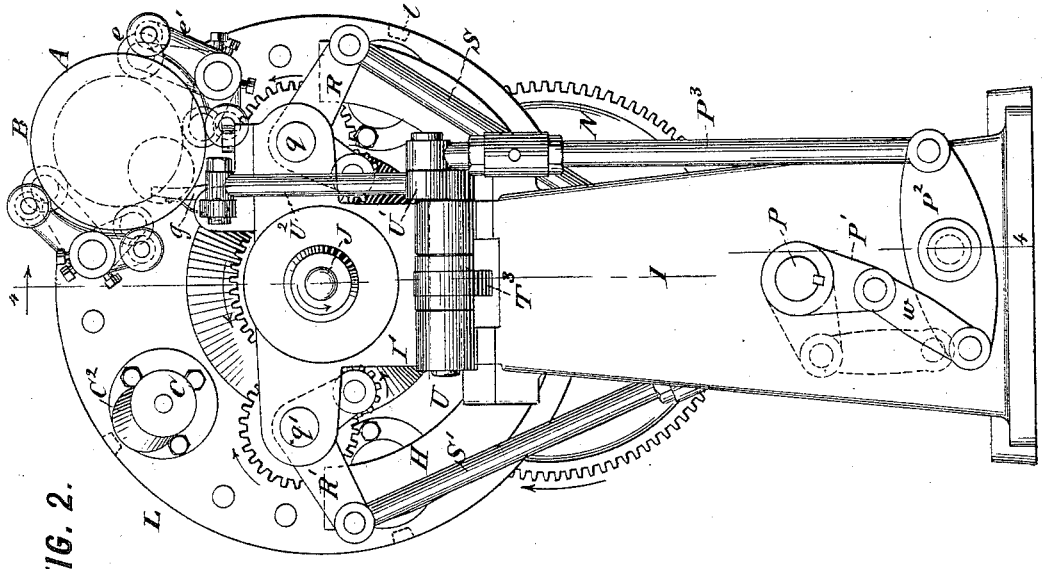
Figure 4:
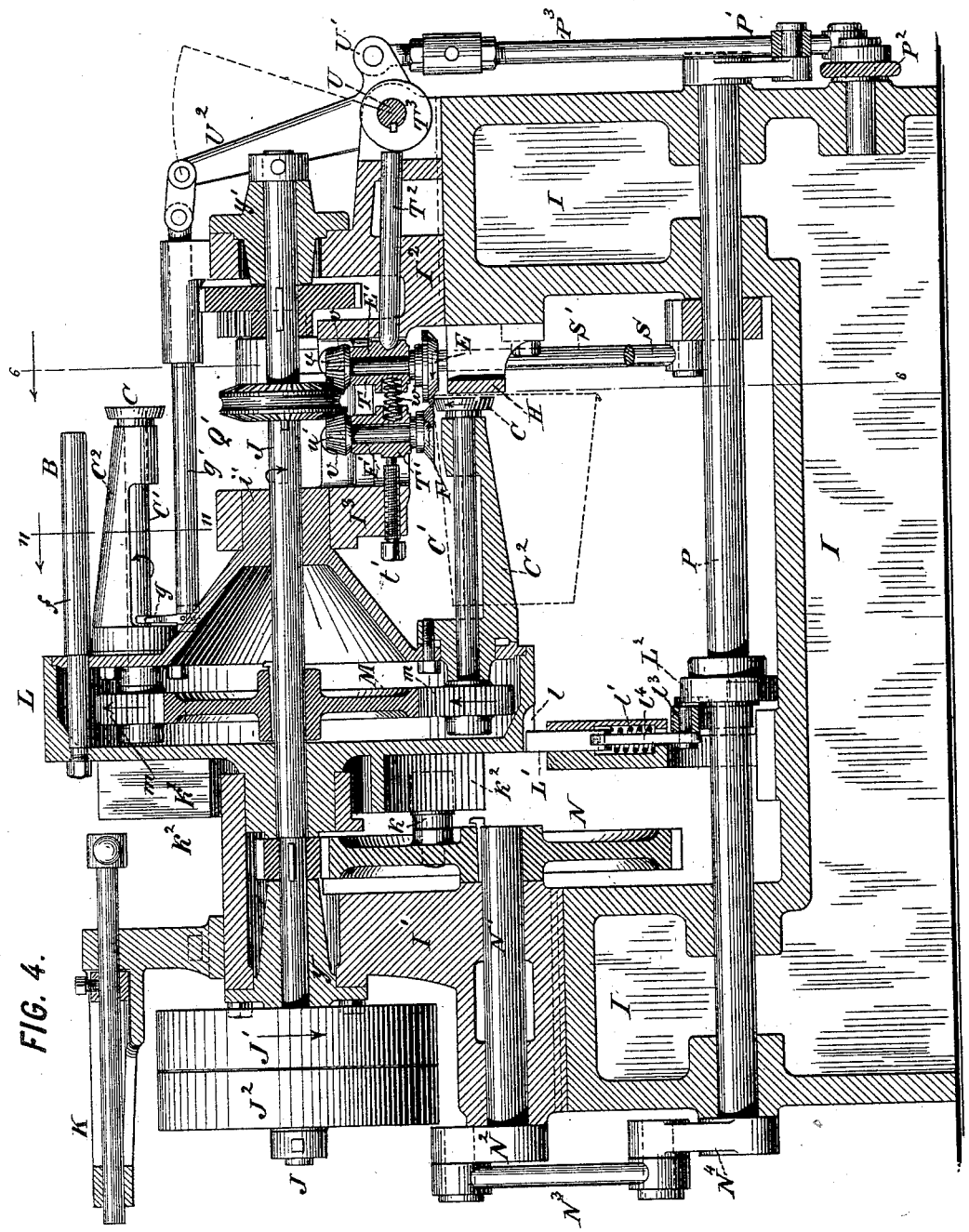
Figure 6:
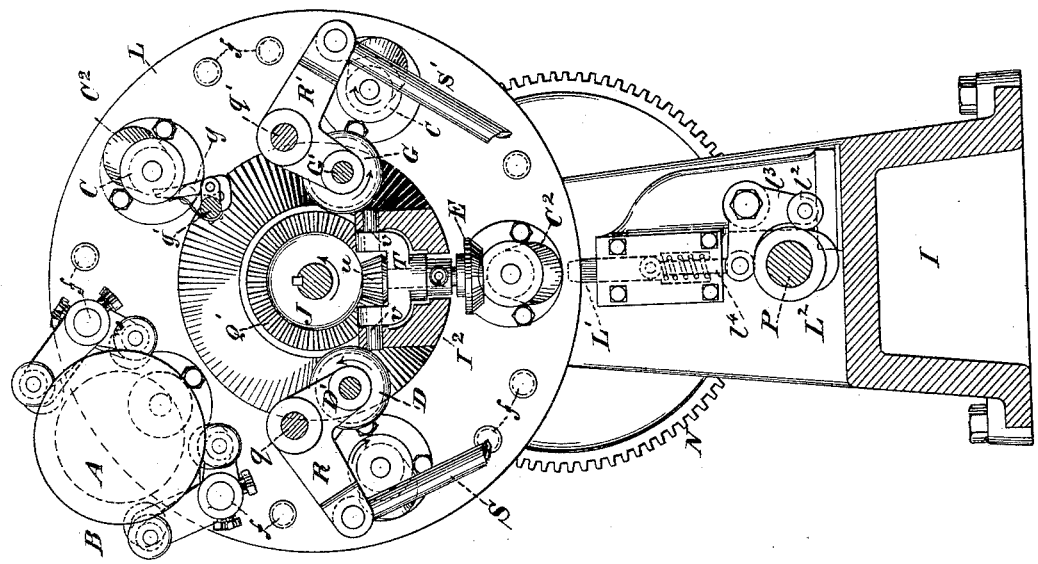
Figure 5:
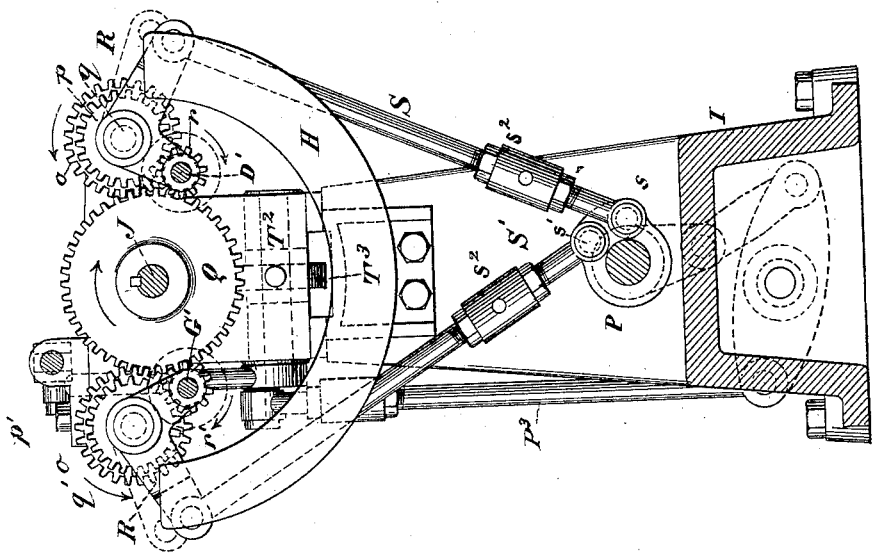
Figure 7:
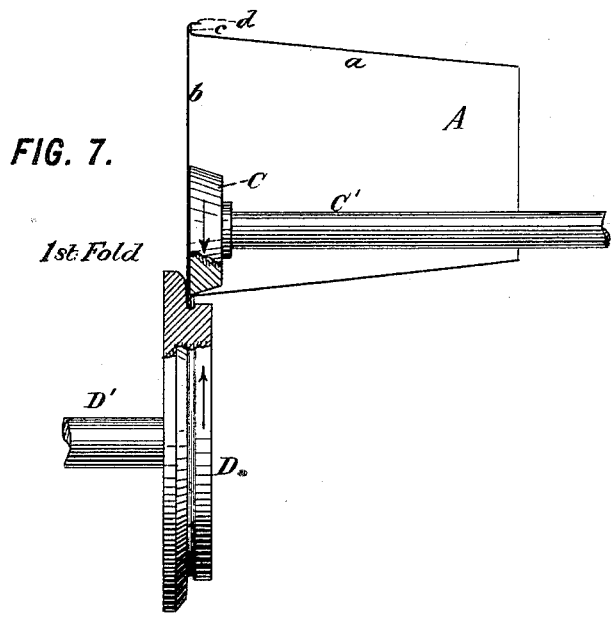
Figure 8:
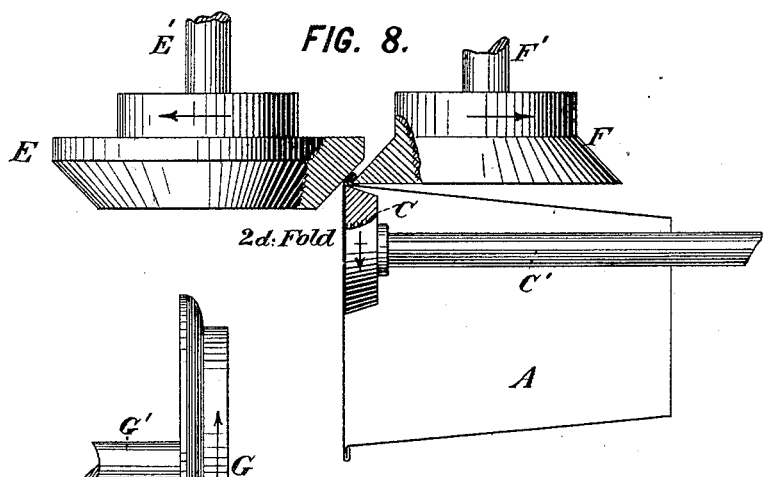
Figure 9:
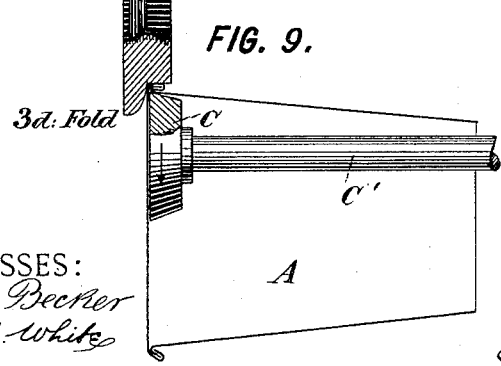
Figure 10:
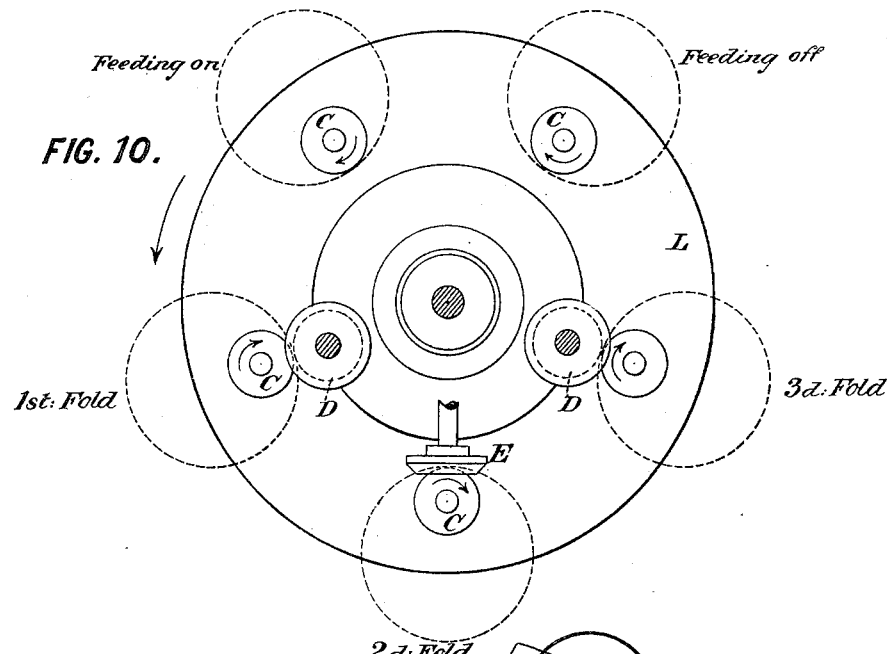
Figure 11:
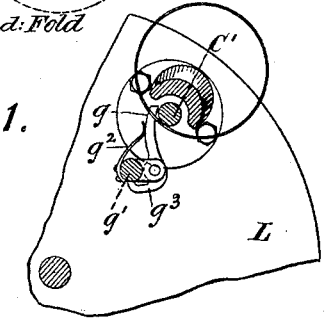
Figure 12:
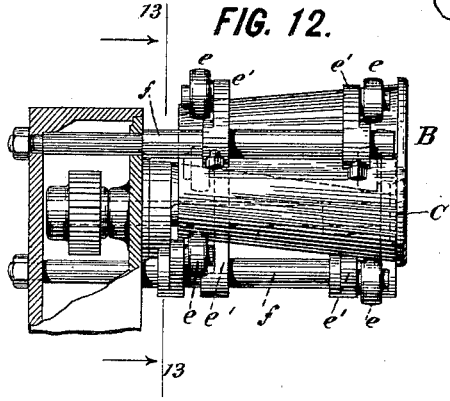
Figure 13:
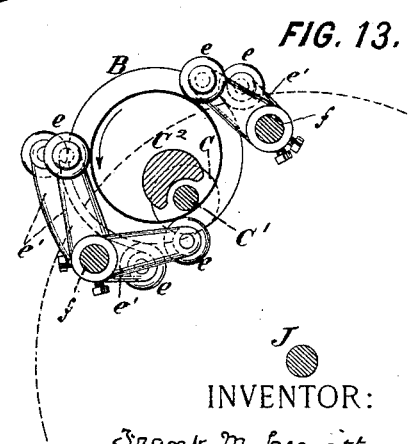
Figure 14:
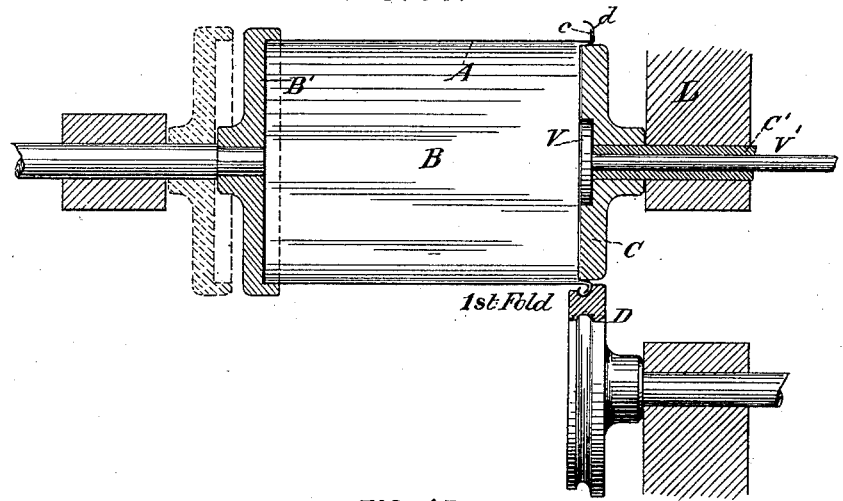
Figure 15:
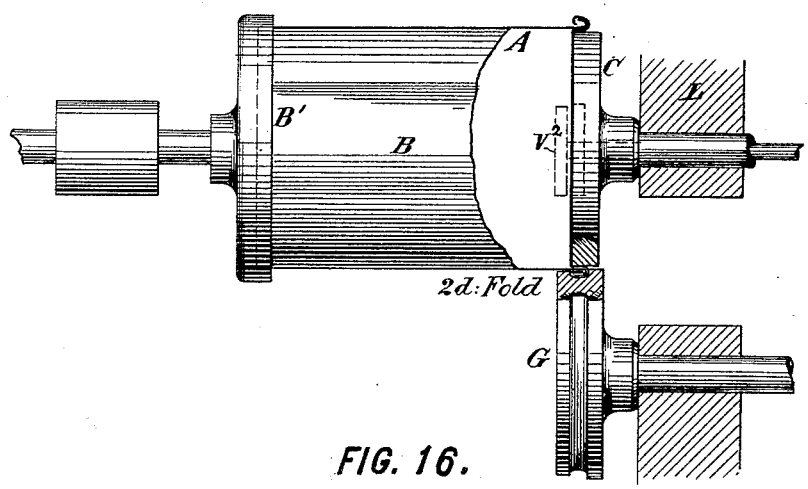
Figure 16:
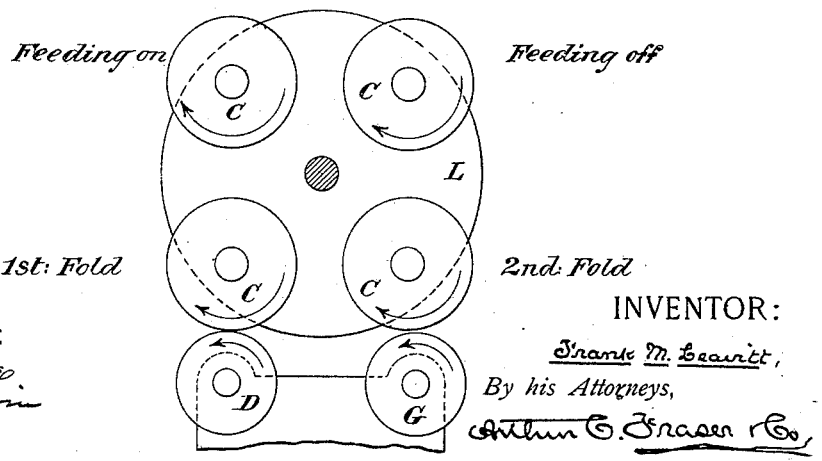

Figure 1 is a right-hand side elevation. Fig. 2 is a front end elevation. Fig. 3 is a rear end elevation. Fig. 4 is a vertical longitudinal mid-section, viewed from the left. Fig. 5 is a vertical transverse section cut in the plane of the line 5 5 in Fig. 1, and looking toward the front. Fig. 6 is a vertical transverse section cut in nearly the same plane as Fig. 5—that is, on the line 6 6 in Fig. 4—and looking toward the rear. Fig. 7 is a horizontal section of the can and the first seamer. Fig. 8 is a vertical section of the can and the second seamer. Fig. 9 is a horizontal section of the can and the third seamer. These three views are on a larger scale than Figs. 1 to 6. Fig. 10 is a diagrammatic front elevation of the several chucks and seamers, showing the positions at which the successive operations are performed. Fig. 11 is a fragmentary vertical transverse section, looking toward the rear, cut in the plane of the line 11 11 in Fig. 4. Figs. 12 and 13 are side and end views of one of the can chucks or holders. Figs. 14, 15, and 16 are views corresponding to Figs. 7, 9, and 10, respectively, showing a modification.

Referring to Figs. 1 to 13, inclusive, I will first describe the active parts or elements of the machine—that is to say, those having a direct action on the cans—after which I will describe the general construction of the machine and the mechanical means by which motion is imparted to these active or essential parts.

Let A A designate the cans, which are shown in dotted lines in Figs. 7, 8, and 9 and in full lines on one of the holders in Figs. 2 and 6, being elsewhere shown in dotted lines or omitted for the sake of greater clearness. I would here remark that by the term "can" in this specification I mean the article to be operated upon by the machine, whether it be a can or some other analogous article, such as a coffee-pot, tin cup, tin pail, &c. Such can consists of a body $a$ and a bottom $b$, the former being already made in tubular form by a suitable side-seaming machine. The body $a$ before entering the present machine has a flange $c$, turned outwardly at its bottom, and the bottom $b$ has an upturned flange $d$, which fits outside of this flange $c$, as shown at the upper side of Fig. 7.

B B are chucks or can-holders, which in this machine are five in number. Each chuck comprises a mandrel-roll C, which is fixed on a rotary shaft C', which enters within the can (or, in the case of certain kinds of seams, may enter merely within the seam) and serves to support the can during the operation of the seaming-rolls. Each chuck or holder also comprises means for retaining the can in proper position upon or relatively to the mandrel-roll C, which means may be greatly varied, but which consist, preferably, of guiding-rollers $e\,e$, (shown best in Figs. 2, 12, and 13,) which are mounted to turn freely on the ends of the crank-arms $e'$, the other ends of which are formed as hubs or eyes embracing the stud $f$, and fastened thereto by set-screws. There are two studs $f\,f$, arranged on opposite sides of each can, and as many rollers $e$ and their cranks $e'$ are provided as may be necessary to guide the can, the rollers being arranged to bear lightly against the can at or near its opposite ends, as shown in Fig. 12, and at sufficiently frequent radial distances—as, for example, according to the arrangement shown in Fig. 13, from which figure the crank-arms $e'$ are omitted for the sake of clearness, with the exception of two of the arms, which are shown in dotted lines. Thus the arrangement of these supporting-rollers is such that a can can be pushed over the mandrel-roll C from the front, and when fully entered, so that its bottom abuts against the face of the mandrel-roll, the rollers $e\,e$ will come against it with light pressure and at sufficient points to hold it in proper position, while offering no obstacle to the free rotation of the can. Other constructions of chucks or can holders or supporters may be provided in lieu of the particular one here shown. I would remark that for the sake of clearness the rollers $e$ and arms $e'$ are omitted from Figs. 1, 2, 4, 5, and 6 of the drawings, with the exception of being shown with reference to one chuck in Figs. 2 and 6. The chucks are so arranged and driven that they occupy successively the five positions shown in Fig. 10, each chuck stopping in each of these positions during a certain time and then traveling to the next position. The can is placed in the chuck in the position marked "Feeding-On" in Fig. 10, and is then moved to the position marked "1st Fold." On reaching this position the first seaming-roll D comes against the can and turns the flange $d$ of the bottom $b$ down over the flange $c$, as shown on the lower side of Fig. 7. This action is due to the roll D being a deeply-grooved roll, as clearly shown. During this operation the can is caused to turn for one revolution by reason of the rotation of the mandrel-roll C and the seaming-roll D, which rotation is imparted to them through their shafts C' and D by suitable gearing. When the can is first brought into position for forming this fold, the roll D is moved toward it and pressed forcibly against it, and at the end of the operation the roll D moves away from the can sufficiently to clear the latter. At the next movement of the chucks the can is brought to the position marked "2nd Fold" in Fig. 10. Here its flange or seam, which now projects downwardly, as shown at the lower sides of Figs. 7 and 8, is grasped between two rollers E and F, constituting the second seamer, which rolls are inversely coned, as clearly shown in Fig. 8, and by the action of which the flange is turned upwardly at an oblique angle, as shown at the upper side of Fig. 8. During this operation the can is supported by the mandrel-roll C within it, and is rotated by the concurrent rotation of the three rolls C, E, and F, imparted to them through their shafts C', E', and F', which are driven by suitable gearing. At the completion of this seaming operation the rolls E F move apart and release the flange. At the next movement of the chuck the can is brought to the position marked "3rd Fold" in Fig. 10. On arriving here the third seaming-roll G is moved against it and acts to press its flange, which now is standing outwardly, as shown on the lower side in Fig. 9, inwardly and close against the body of the can, as shown at the upper side in Fig. 9, the flange being squeezed flat between the seamer G and mandrel C. During this operation the can is rotated one revolution by the concurrent rotation of the rolls C and G, imparted to them by suitable gearing through their shafts C' and G'. At the next movement of the chucks the can is carried to the position marked "Feeding-Off" in Fig. 10. It is here caught by a pusher-finger $g$, mounted on the end of a sliding rod $g'$, (best shown in Figs. 1, 4, 6, and 11,) and by the reciprocating movement of this rod in the direction of the arrow marked against it in Fig. 1 the can is pushed toward the front until it falls out of the chuck or carrier B, when it can be caught by any suitable chute (not shown) and carried away. The finger $g$ projects into the path of revolution of the shafts $C'$ $C'$ in order that it may get a secure bearing against the end of the can. To prevent interference between this finger and the shafts, the finger is jointed to the end of the rod $g'$, as best shown in Fig. 11, being pressed outwardly by a spring $g^2$ and limited in its movement by a tail $g^3$, constituting a stop, so that as the shaft $C'$ travels forward it presses the finger $g$ to one side, and the latter springs back to place when the shaft has passed.

In order to keep the cans from being displaced outwardly relatively to the chucks while moving around from the feeding-on to the feeding-off positions, and while undergoing the action of the seamers, I provide an arc-shaped bearing-plate H, (shown best in Figs. 5 and 4,) which stands in a plane close in front of the bottoms of the cans, and thus prevents the movement of the latter outwardly.

In the foregoing description of the essential parts of my invention and their operation I have omitted, as far as possible, reference to the mechanical means or gearing by means of which the several tools or instrumentalities are caused to operate in proper succession, and I have omitted, also, all reference to the construction of the frame-work supporting the various parts, as all these matters are unessential to my invention in its broader aspect.

I will presently describe in detail the construction of the supporting-frame and driving-gearing which I have thus far adopted in actual practice, and which I prefer; but it is to be distinctly understood that my invention in its broader features is not limited to any special kind of gearing or other mechanical means or connections for driving the chucks, seamers, &c., nor to any particular means for supporting or carrying the several parts; nor is it limited to the particular construction of chuck or can-holder, nor to the particular kind of seamers. The seaming-rolls which I have shown are an old and well-known kind, and operate successively for the folding down of the seam by three folds in the same manner as has been heretofore practiced. The chuck hereinbefore described, in so far at least as the inner mandrel-roll is concerned, combined generally with some means for holding the can in the proper position relative to it, is also old.

Prior to my invention the seaming of cans for uniting the body and bottom together by seams requiring two or more successive folding operations, has always been performed in either one or the other of two ways—first, by the use of separate machines to turn down the successive folds, the can being taken out of one machine and transferred by hand to the next, and, second, the seaming has been effected all in one machine by placing the can in a stationary chuck or holder of such construction that the can is caused to revolve upon its axis and bringing up against the can successively the two or three seaming-rolls, their movement into and out of engagement with the can being effected by hand. By both of these methods a hand manipulation was necessary after each seaming operation, either to remove the can from one machine and carry it to the next or to move one seamer out of action and bring up the next seamer into engagement with the can. Furthermore, only one can could be operated upon at a time, except by duplicating the machines and proportionally increasing the number of operatives engaged in handling them.

My invention provides for the first time means whereby the successive operations essential to the seaming of the can by a seam of two or more folds are performed automatically after the can is once fed to the machine, and whereby in one machine several successive cans are being simultaneously operated upon. The result of my invention is that a considerable economy is effected in the cost of manufacture of cans or other articles the sides and bottoms of which are united by double seaming.

I will now describe in detail the special construction of machine illustrated in Figs. 1 to 13 of the drawings, with special reference to Figs. 1 to 6.

The working parts of the machine are supported in suitable bearings by means of a base frame or standard I and upper frames I', I², and I³ superposed thereon. The construction of these frames will be described in connection with the parts which they respectively support.

J is the driving-shaft of the machine, which is driven by a belt over a fast pulley J', a belt-shifter K being provided for shifting the belt onto a loose pulley J², and the belt-shifter being provided with a brake-shoe K', (shown best in Fig. 3,) which may be brought down upon the fast pulley in order to stop the machine after the belt has been shifted to the loose pulley. The driving-shaft J extends longitudinally through the machine and has fixed upon it gears for communicating motion to the driven parts.

The several shafts $C'$ $C'$ of the mandrel-rolls of the chucks are carried in bearings in frames or brackets C², which brackets are firmly bolted to the front face of a turret or turn-table L, which is rotatively mounted on an axis coincident with that of the shaft J. This turret is formed with journals $i$ and $i'$, which are mounted to turn in bearings in the upper frames I and I³, as best shown in Fig. 4. The turret is hollow, being constructed, preferably, of two pieces, as shown in Fig. 4, united at intervals by bolts, which bolts consist of the studs $f f$, already described. In the hollow of the turret are arranged a gear-wheel M, keyed on the shaft J, and pinions $m\ m$, which are fixed on the rear ends of the respective shafts C' C'. Thus, while the turret is stationary the shafts C' and mandrel-rolls C are caused to revolve through the intermeshing of the gear M and pinions $m\ m$. The turret L is revolved intermittently, moving at each turn one-fifth of a revolution, in order to advance each of the five chucks or can-holders to the position occupied by the preceding one. This intermittent movement may be effected in various ways known to the mechanic arts, the means which I prefer consisting of the mechanical movement known as the "Geneva stop-movement." The pinion $j$, fixed on the shaft J, meshes, as shown in Fig. 4, with a gear-wheel N, fixed on a shaft N'. The gear M carries a crank-stud $k$, the projecting end of which may be provided with an anti-friction bowl or roller. This stud (or its roller) enters at each revolution of the wheel N in the direction shown by the arrow $x$ in Fig. 3, into the open end of one of the radial slots $k'$ of the Geneva stop-movement, and by the continued rotation of the wheel N engages the walls of the slot and causes it to advance one-fifth of a revolution, upon the completion of which the stud $k$ moves out of the slot $k'$. In Fig. 3 it is shown at the instant of emerging from the slot. The parts are so proportioned that the stud enters and leaves the slot in line with the axis of the latter, so that the movement is imparted to the slot gradually and it is again brought gradually to a stop. The slots $k'$ are constructed, preferably, by means of flanges $k^2$, formed on the rear face of the turret L, as shown in Figs. 1, 3, and 4. Thus the turret is moved at each advance with an easy and positive motion, through the action of this Geneva stop-movement. With the proportions shown its period of movement occupies about thirty per cent. of the time of revolution of the wheel M, while for the remaining seventy per cent. or so thereof the turret remains stationary.

To prevent displacement of the turret during its periods of rest, and to hold it firmly and solidly in position and constitute it, during such times, practically a part of the fixed frame of the machine, I provide a lock for the turret, consisting of a bolt L', entering in succession five equally-spaced notches $l\ l$, formed in the exterior of the turret, as shown in Figs. 1, 3, and 4. This bolt L' is pressed upwardly by a spring $l'$, Fig. 4, and is operated by a cam L² on a rock-shaft P, through the medium of a roller $l^2$, against which this cam acts, an elbow-lever $l^3$ carrying said roller on one arm, as shown in Fig. 6, and a link $l^4$ connecting the other arm of said lever to the bolt L', as shown in Figs. 6 and 4. The movement of the rock-shaft P is so timed that the projection of the cam L² displaces the roller $l^2$, and hence withdraws the bolt L' once in each revolution and at the instant before the stud $k$ enters the radial slot $k'$, thereby unlocking the turret just before it is moved forward. The rock-shaft P is driven from the shaft N', through the medium of a short crank N², fixed on said shaft, which in its rotation communicates movement through a pitman N³ to a long crank N⁴, fixed on the rock-shaft P, thereby reciprocating this long crank and rock-shaft between the positions shown in full lines and that shown in dotted lines in Fig. 3, or through an arc of approximately thirty-five degrees.

I will now describe how the seamers D, E, F, and G are driven. On the driving-shaft J is fixed a gear-wheel Q, which meshes on opposite sides with two gears $l\ l'$, as shown in Fig. 5. To each of these latter gears is fixed another smaller gear, lettered, respectively, $p$ and $p'$. These gears $l\ p$ and $l'\ p'$ turn freely on studs $q\ q'$, respectively, and on these same studs are fulcrumed elbow-levers R and R', respectively. In the pendent arms of these levers are formed bearings in which turn, respectively, the shafts D' and G' of the seaming-rolls D and G. Each of these shafts carries its seaming-roll on its rear end, and on its front end is fixed a pinion $r$ or $r'$, respectively, these pinions meshing, respectively, with the gears $q$ and $q'$. Thus by the rotation of the shaft J the seamers D and G are driven in the direction of the arrows marked on them in Figs. 5 and 6. The function of the elbow-levers R and R' is to render these seamers movable toward or from the cans while the latter are held in the chucks. To effect this movement, the elbow-levers are connected through rods S and S', respectively, to cranks $s$ and $s'$ on the rock-shaft P, as best shown in Fig. 5. The rods S S' are preferably constructed to be extensible through the medium of the right and left threaded sleeves $s^2\ s^2$, as shown in Fig. 5, although they may be made without this adjustment, as shown in Fig. 1. By the rocking movement of the shaft P the elbow-levers R R' are vibrated to the extent indicated by the dotted lines in Fig. 6, whereby the seamers D and G are moved toward and from the can. The parts are so timed that immediately after the advancing movement of the turret L, and as soon as the latter has come to rest, the seamers D and G are moved toward the cans, so as to press firmly thereagainst and properly bend down the seams thereof while the cans are being revolved between the seamers and the mandrel-rolls C C, by reason of the rotation of the seamers and respective rolls, in the direction of the arrows marked on them in Fig. 6, and at the completion of these seaming operations and before the next advance movement of the turret the seamers are moved away from the cans, in order to free them and permit of their travel to the next position.

The second seaming-rolls E and F are mounted, respectively, on vertical shafts E' and F', on the upper ends of which shafts are fixed bevel-pinions $u$ and $u'$, respectively, which mesh with the opposite faces of a double-faced bevel-gear Q', which is fixed on the driving-shaft J, and whereby the two shafts E' and F' are revolved in opposite directions, so that the rolls E F turn toward each other, all as clearly shown in Fig. 4. The two shafts E' and F' have bearings in two pivoted frames T and T', respectively, both of which are hung, in the manner clearly shown in Fig. 6, with reference to the frame T, by means of pivotal pins $v$ $v$, projecting on a horizontal transverse axis at the upper end of the frame and entering holes in the fixed frame I². The positions of these pivotal pins $v$ $v$ are clearly shown by the circles in Figs. 1 and 4, the axes being thus arranged in such positions that the swinging of the frames T T' upon these pivots will not disturb the meshing of the pinions $u$ $u'$ with the gear Q'. This provision of the swinging movement is designed in order to allow of the rolls E and F being moved together to engage the flange of the can between them and moved apart to release it. The two frames are firmly pressed apart by a spring $w$ between them, Fig. 4. The rear frame T' is seated against an adjusting-screw $t'$, Fig. 4, by which it is adjusted to the exact position desired. The roll E is thus alone movable, and is moved toward the roll F by means of rearward pressure exerted against the frame T through the medium of a rod T², sliding in bearings in the frame I², the forward or releasing movement of the roll E being effected by the spring $w$. The movement of the rod T² is imparted to it by means of a cam T³, fixed on a transverse rock-shaft U.

The shaft U is driven from the rock-shaft P through the medium of the mechanism shown best in Figs. 1 and 2. On the front end of the shaft P is fixed a crank P', which acts through a connecting-rod $w'$ upon one arm of a walking-beam P², the other arm of which connects by a connecting-rod P³ with a crank-arm U', fixed on the end of the shaft U. The parts P' $w'$ P² reciprocate between the positions shown in full and dotted lines in Fig. 2, thus rocking the crank-arm U' and shaft U to the extent indicated by the full and dotted lines in Fig. 1. The feeding-off rod $g'$ is reciprocated from the rock-shaft Q through the medium of an upwardly-projecting arm or lever U², which connects with the rod through a link $g^4$.

The entire machine is supported by the base-frame or standard I, which constitutes, also, bearings for the shaft P, and on the rear end of the frame I is mounted the frame I', which forms bearings for the shaft N' and for the journal $i$ of the turret. On the front end of the frame I is mounted the frame I², which forms bearings for the shaft U, the sliding pin T², the sliding rod $g'$, and the trunnions of the frames T T'. The frame I³ projects rearwardly from the frame I, being preferably constructed integrally therewith, and constitutes a bearing for the journal $i$ of the turret. The shaft J is hung in two end bearings $y$ and $y'$, which are mounted on frames I' and I², respectively. The shaft is steadied at intermediate points by bearings formed in the tubular turret-journals $i$ and $i'$.

The operation of the machine as a whole has been rendered sufficiently obvious by the general preliminary description of the invention and the detailed description of the construction and operation of the several parts.

It will be obvious that the mechanism through which my invention is carried into practical effect may be greatly varied by the exercise of the judgment and designing skill ordinarily devoted by engineers to the designing of machinery to carry out a given series of operations.

It is to be well understood that my invention is not to be limited to the details of mechanism which I have herein so particularly described, as the same essential operations may be effected in many other ways. For example, the several chucks or holders B B for the cans, instead of being all mounted on a revolving part—such as the turret L—may be connected together and to a source of power in many other different ways, it being only essential that they shall be caused to travel successively from each point of operation to the next and that their successive movements shall be so timed with those of the seamers as to perform the operations of seaming in substantially the same manner explained in the preliminary portion of this specification.

Although it is preferable that each chuck or holder should come to a stop during the performance of each seaming operation, this being the method requiring the simplest mechanism to carry it into effect, yet the machine might readily be so modified that the seamers should perform their work without any stoppage of the chucks or can-holders. All such modifications I consider within the province of the good judgment and purely technical skill of the designer or constructer and as not involving the essential principles of my invention broadly considered.

Thus far in this specification I have described only the seaming of cans by three successive seaming or folding operations, referred to as the first, second, and third folds. It is well known in the art, however, that cam-seams may be made with other numbers of folds, as two or four, the particular fold being a matter of judgment or advisabilty in the case of any particular product. I have selected the threefold method of seaming as being the one ordinarily deemed most desirable; but it is obvious that my invention may be applied in the case of two, four, or any other number of folds.

The fold shown in Figs. 7, 8, and 9 is preferred for many kinds of work—as, for example, for the bottoms of coffee-pots, because it admits of the bottom being flat instead of recessed upwardly.

In Figs. 14, 15, and 16 I have illustrated the application of my invention to the seaming of cans with two folds, the seam being of that character requiring a recessed bottom for the can. In this case the chuck B consists of a mandrel-roll C coming against the exterior side of the bottom of the can, and a holder-disk B' coming against the opposite end of the can. The can being set with its bottom against the mandrel C, the disk B' moves toward it until it grasps the can-body and holds it firmly against the bottom, as shown in Fig. 14. The chuck then turns from the feeding-on position in Fig. 16 to the first-fold position, thereby bringing the flanges c and d, which are of the form shown in the upper side of Fig. 14, against the first seaming-roll D, which crimps the flanges into the shape shown at the lower side of Fig. 14. This seaming having been effected around the entire circumference of the can, the chuck moves to the second-fold position in Fig. 16, thereby bringing the flange against the second seaming-roll G, which flattens it down in the manner shown at the lower side of Fig. 15. Upon the completion of this seam around the entire circumference the chuck moves to the feeding-off position in Fig. 16, in which position the disk B' is moved back to the position shown in dotted lines in Fig. 15, and a pressing-off pad or piston V (worked by a stem V', passing axially through the shaft C', as shown in Fig. 14) is moved out to the position shown in dotted lines at V² in Fig. 15, thereby pressing the completed can off from the mandrel C, and causing it to fall out of the machine.

Other modifications may readily be designed by any practical constructer to apply the principle of my invention to making all different kinds of seams requiring a plurality of seaming operations.

I am well aware that can filling, heading, and soldering machines have been made in which the successive operations of, first, filling; second, seaming down the cover by a single folding-roller, and, third, soldering the temporary seam thus made to form a tight joint have been performed automatically in successive positions of the can. This, however, differs essentially from my invention, which introduces an improvement in the art of "double-seaming," or the making of a seam by two or more successive bending operations, enabling those operations to be performed upon the seam in quick succession in the same machine and without handling, instead of the slow hand manipulations, attended by frequent handling, heretofore necessary.

I claim as my invention the following defined novel features, substantially as hereinbefore specified, namely:

1. A can-seaming machine of the class wherein the seam between the can body and head is formed by two or more successive bending operations, consisting of the combination of traveling chucks or holders for the cans, and two or more seamers adapted each to perform one of the successive bending operations, constructed to act upon the cans successively in successive positions of the holders.

2. A can-seaming machine of the class wherein the seam between the can body and head is formed by two or more successive bending operations, consisting of the combination of traveling chucks or holders for the cans, and two or more seamers adapted each to perform one of the successive bending operations and arranged in positions to act upon the cans held by successive holders, whereby the seaming operations are performed simultaneously on successive cans and successively on each individual can.

3. A can-seaming machine of the class wherein the seam between the can body and head is formed by two or more successive bending operations, consisting of the combination of intermittently-advancing traveling chucks or holders for the cans and two or more seamers adapted each to perform one of the successive bending operations, arranged to act upon cans held by successive holders in their positions of rest, and driving mechanism for alternately advancing the holders and operating the seamers, whereby each can is alternately seamed and moved forward.

4. A can-seaming machine consisting of the combination of traveling chucks or holders for the cans, two or more seamers arranged to act upon the cans successively in successive positions of the holders and consisting of revolving seaming-rolls each adapted to perform one of the successive bending operations on the seam, and mechanism for revolving said holders during the seaming operations in order to present the entire circumference of the can to the action of each of the successive seamers.

5. A can-seaming machine consisting of the combination of traveling chucks or holders for the cans, each chuck comprising a mandrel-roll entering within and supporting the same, and means engaging the can-body externally for holding the can in the proper position relatively to said roll, two or more seamer-rolls adapted to perform successive bending operations on the seam, arranged to act upon the cans successively in successive positions of the holders, and means for concurrently revolving the mandrel and seamer rolls during the seaming operations, whereby the can is revolved between them and its entire circumference is presented to the seaming action of the rolls.

6. The combination of an intermittently-revolving turret, mandrel-rolls carried thereby, two or more successive seamer-rolls adapted to act against said mandrel-rolls in the successive positions of the latter and movable toward and from the mandrel-rolls, mechanism for revolving the mandrel and seaming rolls, and mechanism for alternately advancing the turret and moving the seamer-rolls toward and from the mandrel-rolls.

7. The combination of an intermittently-revolving turret, mandrel-rolls carried thereby, a first-fold seamer-roll arranged to act against the mandrel-rolls in one position of rest thereof, two second-fold seamer-rolls arranged to act in the next position of rest thereof, a third-fold seamer-roll arranged to act in the next successive position of rest thereof, mechanism for revolving said rolls, and a driving mechanism for alternately advancing the turret and for bringing together and separating the second seamer-rolls.

8. The combination of an intermittently-revolving turret, a series of mandrel-rolls carried thereby, pinions on the shafts of said rolls, a gear-wheel on the same axis as the turret, meshing with all of said pinions for imparting simultaneous rotation to the mandrel-rolls, a driving-shaft passing through the turret and carrying said gear, seamer-rolls arranged to act successively against the mandrel-rolls in their positions of rest, gearing between said driving-shaft and seamer-rolls for revolving the latter, and a driving mechanism for intermittently advancing said turret.

9. In a can-seaming machine, the combination of an intermittently-revolving turret made hollow and formed with tubular journals on opposite sides, a frame having bearings for said journals, a driving-shaft passing through said hollow journals, a gear-wheel fixed on said shaft within the hollow of the turret, a series of mandrel-rolls carried by the turret with their shafts entering the hollow thereof, and pinions fixed on said shafts and meshing with said gear, whereby the mandrel-rolls are rotated.

10. In a can-seaming machine, the combination, with a series of traveling chucks or holders for the cans and two or more seamers adapted to act upon the cans successively, of an intermittently-revolving turret carrying said holders, a Geneva stop-movement for intermittently advancing said turret, consisting of a revolving crank engaging at each revolution with successive radial grooves on the turret, a locking-bolt for engaging the turret and holding it fast during its positions of rest, and a driving mechanism for engaging said bolt as the turret comes to rest and withdrawing it before the next advance movement.

11. The combination, with a series of traveling chucks or holders for the cans and a revolving turret carrying them, of seamer-rolls E and F, a driving-shaft geared to the shafts of said rolls for rotating the rolls, one or both of said rolls movable toward and from the other, a movable frame in which the shaft of the movable roll has bearings, and mechanism for moving said frame at intervals to carry its roll toward and from the other roll.

12. In a can-seaming machine, the combination, with a series of traveling chucks or holders for the cans, of seamer-rolls E and F, gearing for rotating them, pivoted frames T and T', in which their shafts have bearings, an adjusting-screw for adjusting the position of one of said frames, a spring arranged to press said frames apart, and a cam $T^3$ for pressing the movable frame at intervals toward the fixed frame in order to bring the rollers E and F together.

13. In a can-seaming machine, the combination, with a series of traveling chucks or holders for the cans, of a seamer-roll arranged to act against the can in one position of said holders, an elbow-lever in which the shaft of said seamer-roll has bearings, a connecting-rod for imparting motion to said lever, and a shaft for moving said rod at intervals in order to carry the seamer-roll into and out of engagement with the can.

14. In a can-seaming machine, the combination, with a series of traveling chucks or holders for the cans and two or more seamers adapted to act upon the can successively, of a feeding-off mechanism consisting of a sliding rod $g'$, having a finger $g$, the lever-arm $U^2$, connected to said rod, and a driving mechanism for alternately advancing the chucks or holders and vibrating the said lever outward and back.

15. In a can-seaming machine, a chuck or holder for the cans, consisting of a mandrel-roll C, a bracket $C^2$, in which its shaft has bearings, and adjustable guiding-rollers $e\ e$, arranged to bear against the exterior of the can and hold it in proper position relatively to said mandrel-roll.

16. In a can-seaming machine, the combination of a revolving turret, a series of chucks or holders for the cans carried thereby and comprising each a mandrel-roll adapted to enter the can and means for holding the can in position relatively to said roll, said mandrel-rolls being on axes parallel with the axis of rotation of the turret, and an arc-shaped bearing-plate H, arranged in position to be traversed by the heads of the cans while carried by said holders, whereby the cans are held from displacement outwardly, and the mandrel-rolls are retained in engagement with the seams.

In witness whereof I have hereunto signed my name in the presence of two subscribing witnesses.

FRANK M. LEAVITT.

Witnesses:
DENNIS JUDGE,
CHARLES WAGNER.